Jan. 6, 1925.  
S. E. CHALAVOUTA  
1,521,867  
HEATING DEVICE FOR STEAM TABLES OR THE LIKE  
Filed March 29, 1924

Inventor:  
Stamati E. Chalavouta  
By  
Attorneys

Patented Jan. 6, 1925.

1,521,867

UNITED STATES PATENT OFFICE.

STAMATI E. CHALAVOUTA, OF DETROIT, MICHIGAN.

HEATING DEVICE FOR STEAM TABLES OR THE LIKE.

Application filed March 29, 1924. Serial No. 702,748.

*To all whom it may concern:*

Be it known that I, STAMATI E. CHALAVOUTA, a citizen of Greece, residing at Detroit, in the county of Wayne and State of Michigan, have invented certain new and useful Improvements in Heating Devices for Steam Tables or the like, of which the following is a specification, reference being had therein to the accompanying drawings.

This invention relates to a steam table such as used in restaurants for heating pots and dishes maintained in and on a table for serving various kinds of food. Various types of such tables are in use and ordinarily include a large tank containing water heated by burners under the tank and the generated steam heats such pots and dishes that may be in or on the table. On account of there being a large volume of water in the tank is requires considerable time and fuel to heat the water, especially an expenditure of gas for at all times maintaining the water at such a temperature that it will generate steam.

My invention aims to provide a steam table wherein the volume of water employed for generating steam is comparatively small and only necessitates the use of a single gas burner or other heating device. Provision is made for supplying water to the steam table as fast as the water is converted into steam.

My invention further aims to provide a steam generating equipment for steam tables that may be substituted for the present apparatus employed for supplying steam to a steam table, this being accomplished without material change and modification, thus permitting of an old steam table being readily converted into a steam table in accordance with this invention.

My invention further aims to provide a steam generating apparatus for a steam table wherein comparatively dry steam is supplied to the upper part of the table so that any steam vapor or condensate will be in the lower part of the table and more readily drain back into the water receptacle of the table.

The construction entering into my invention will be hereinafter specifically described and then claimed, and reference will now be had to the drawing, wherein—

Figure 1:
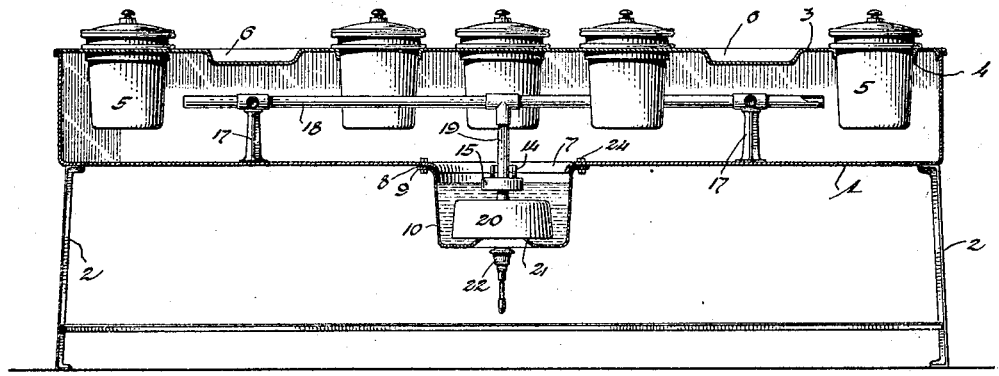
Figure 1 is a longitudinal sectional view of the steam table in accordance with my invention.
Figure 2:
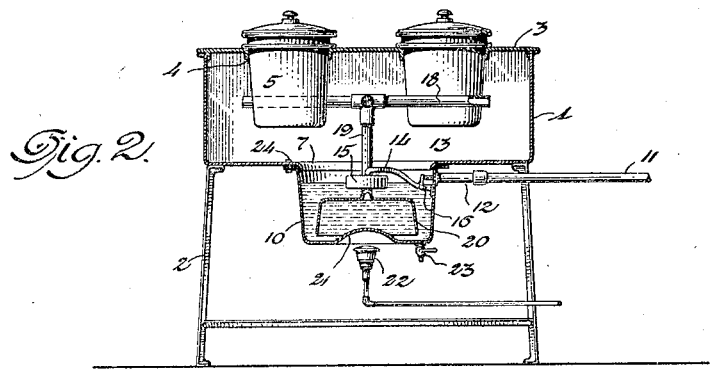
Fig. 2 is a cross sectional view of the same.
Figure 3:
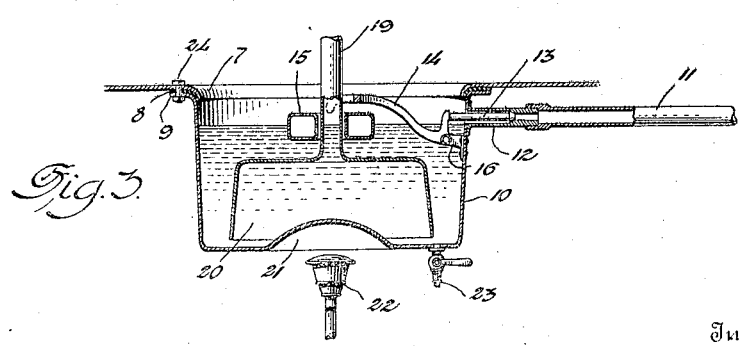
Fig. 3 is an enlarged detail view of the water receptacle of the table.

In the drawing, 1 denotes an oblong tank supported by legs 2 and on the tank is a cover 3 constituting a table top, said cover having pot openings 4 in which may be placed pots 5 containing food. The openings 4 may be shaped to accommodate various kinds of dishes or receptacles so that the lower portions thereof will be suspended within the tank 1.

The cover 3 may be formed with depressed portions 6 serving as receptacles or containers for food.

The bottom of the tank 1 has a central flanged opening 7 and seated against the marginal edges of said opening is a gasket 8 against which is placed the flanges 9 of a water receptacle 10, with the flanges 9 connected to the bottom of the tank 1 by nut equipped bolts 24 or other fastening means. The gasket 8 is compressed and forms a steam and water tight connection between the tank 1 and the water receptacle.

Connected to the upper portion of the receptacle 10 is a tubular valve body 12 communicating with the receptacle 10 and with a water supply pipe 11. In the valve body 12 is a plunger valve 13 adapted to be opened by water pressure and closed by a lever 14 and a float 15 with the latter buoyant on the body of water within the receptacle 10. The lever 14 is pivotally supported by a bracket 16 on the inner wall of said receptacle, said lever being somewhat in the form of a bell crank having one end engaging the plunger valve 13 and the opposite end forked to engage on top of the float 15.

Mounted in the tank 1 are supports 17 for a tubular open dry steam supplying frame 18 which has a depending connection 19 extending into the receptacle 10 and provided with a hood 20 which is directly over a convexo concave bottom portion 21 of the receptacle 10. The connection 19 serves as a guide for the float 15, which is preferably circular with the connection 19 extending therethrough, consequently the float cannot become accidentally displaced relative to the lever 14.

Below the convexo concave portion 21 of the water receptacle is a gas burner 22 or other heating device.

When the gas burner 22 is ignited the water in the receptacle 10 is heated and on account of the volume of water in the hood 20 being subjected direct to the heated convexo concave portion 21 of the receptacle 10 a comparatively dry steam will be generated and pass through the connection 19 and out of the frame 18, said frame distributing the steam so that the upper portion of the tank 1 is filled with steam about the pots 5 to heat the same. The steam generated from the water in the receptacle 10 will pass out of said receptacle into the bottom of the tank 1 and there will be more or less a stratification of steam within the table. As fast as the water is converted into steam and the level of water lowered in the receptacle 1 the valve admits more water so that the receptacle 10 cannot boil dry.

With the bottom of the tank 1 slightly inclined towards the opening 7 any condensate may drain back into the receptacle, and it is obvious that my steam generating apparatus requires less water and less gas than if the tank 1 were partially filled with water and had to be heated by two or more gas burners.

The receptacle 10 has a drain cock 23 which permits of the receptacle 10 being flushed and sediment removed therefrom.

The entire steam table is preferably made of metal that will not corrode and may be finished, especially the table top, to present a neat, attractive and sanitary appearance.

I desire to direct attention to the fact that the receptacle 10, the dry distributing frame 18, the dome 20 and the feed water valve may form an equipment to be used in connection with various kinds of cooking, baking or steaming apparatus and is not necessarily limited to a steam table, such as used in restaurants. I further desire to direct attention to the fact that dry steam emitted by the frame 18 keeps the upper portions of the pots 5 just as hot as the lower portions thereof, and that by isolating a quantity of water in the hood 20 from that in the receptacle 10 that steam can be quickly raised for heating purposes.

One embodiment of my invention has been illustrated, but it is to be understood that the structural elements are susceptible to such variations and modifications as fall within the scope of the appended claims.

What I claim is:—

1. A steam table comprising a tank adapted to have pots extend therein, a receptacle supported from the bottom of said tank and adapted to have the bottom thereof heated, automatic water supply means for said receptacle, and means axially of said receptacle extending into said tank and in lateral directions therein adapted to supply steam to said tank.

2. A steam table comprising a tank adapted to have pots extend therein, a steam generator supported from the bottom of said tank and adapted to supply steam to the bottom of said tank, and means in said steam generator adapted to supply steam to the upper portion of said tank in addition to the steam supply to the bottom of said tank, said means extending in lateral directions between the pots in said tank.

3. A steam table comprising a tank adapted for heating food, a receptacle carried by the bottom of said tank and communicating therewith, means for supplying water to said receptacle, means for heating said receptacle, and means concentric of said receptacle extending into said tank and in lateral directions therein adapted to distribute steam in said tank.

4. A steam table comprising a tank having pots extending therein for heating food in the pots, a receptacle carried by the bottom of said tank and communicating therewith, a valve adapted to admit water to said receptacle, heating means for said receptacle, a steam distributing frame in said tank adapted to distribute steam about the pots therein, a dome in said receptacle, a connection between said dome and said frame and adapted to supply steam thereto, and buoyant means in said receptacle about said connection adapted to automatically control said valve.

In testimony whereof I affix my signature in the presence of two witnesses.

STAMATI E. CHALAVOUTA.

Witnesses:
JOHN G. BARBAS,
LEWIS E. FLANELERS.